No. 786,775. PATENTED APR. 4, 1905.
L. G. NILSON.
ELECTRIC MOTOR CONTROLLING APPARATUS.
APPLICATION FILED JUNE 10, 1904.

3 SHEETS—SHEET 1.

Witnesses
Julian T. Worster
George N. Kerr

Lars G. Nilson  Inventor
By his Attorney C. W. Edwards

No. 786,775. PATENTED APR. 4, 1905.
L. G. NILSON.
ELECTRIC MOTOR CONTROLLING APPARATUS.
APPLICATION FILED JUNE 10, 1904.

3 SHEETS—SHEET 2.

Witnesses
Julian T. Wooster.
George N. Kerr.

Lars G. Nilson Inventor
By his Attorney C. W. Edwards

No. 786,775. PATENTED APR. 4, 1905.
L. G. NILSON.
ELECTRIC MOTOR CONTROLLING APPARATUS.
APPLICATION FILED JUNE 10, 1904.

3 SHEETS—SHEET 3.

Witnesses
Julian Wooster
George N. Kerr

Lars G. Nilson Inventor
By his Attorney C. W. Edwards

No. 786,775.

Patented April 4, 1905.

UNITED STATES PATENT OFFICE.

LARS G. NILSON, OF HOBOKEN, NEW JERSEY, ASSIGNOR, BY MESNE ASSIGNMENTS, TO FISCHER MOTOR VEHICLE COMPANY, A CORPORATION OF NEW JERSEY.

ELECTRIC-MOTOR CONTROLLING APPARATUS.

SPECIFICATION forming part of Letters Patent No. 786,775, dated April 4, 1905.

Original application filed May 15, 1902, Serial No. 107,391. Divided and this application filed June 10, 1904. Serial No. 211,945.

*To all whom it may concern:*

Be it known that I, LARS G. NILSON, a citizen of the United States, residing at Hoboken, in the county of Hudson and State of New Jersey, have invented certain new and useful Improvements in Electric-Motor Controlling Apparatus, of which the following is a full, clear, and exact specification.

This invention relates to electric-motor control, and has especial reference to a system of control for self-propelled vehicles, such as automobiles, &c.

The objects of the invention are to provide an improved system of control for a motor-vehicle driven from a dynamo in conjunction with a storage battery, whereby the battery may supply the motor as an auxiliary to the dynamo and whereby the motor may be readily controlled to act as a motor, a variable brake, or as a dynamo to charge the battery, according to the conditions. In order to attain these objects in a simple and safe manner, I provide a main and an auxiliary controller, the main controller regulating the ordinary running of the vehicle, and an auxiliary controller regulating the motor when used as a braking means or as a dynamo to charge the battery.

To prevent accidents, the auxiliary controller is so connected with the main controller as to be operative for regulating only at any position of the main controller, but inoperative for any other purpose except when the main controller is in such position that the operation of the auxiliary controller will not tend to cause any injury to the mechanism.

The invention also includes various details and constructions of the parts which I consider best adapted to secure the objects of the invention and which will be more fully described hereinafter.

Figure 1:
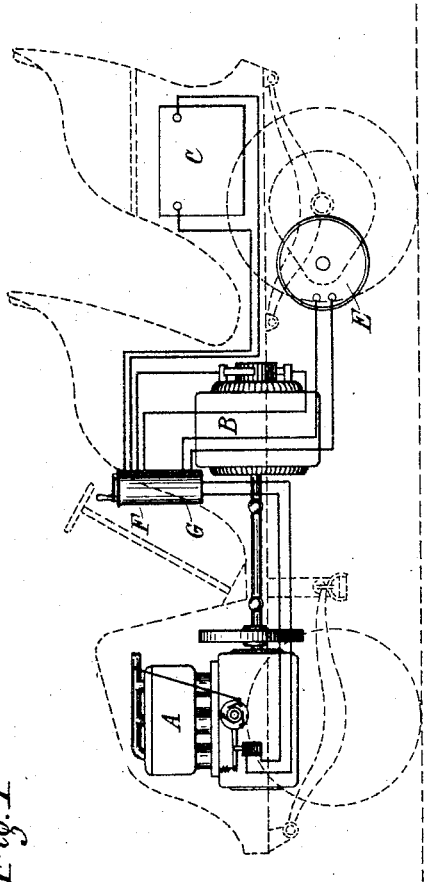
Figure 2:
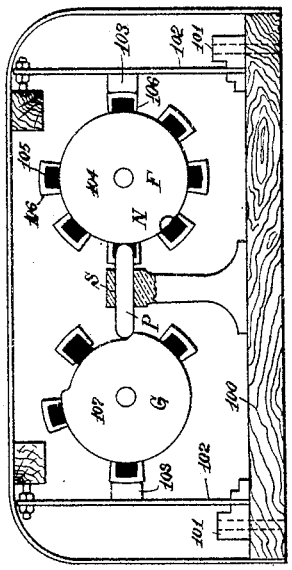
Figure 3:
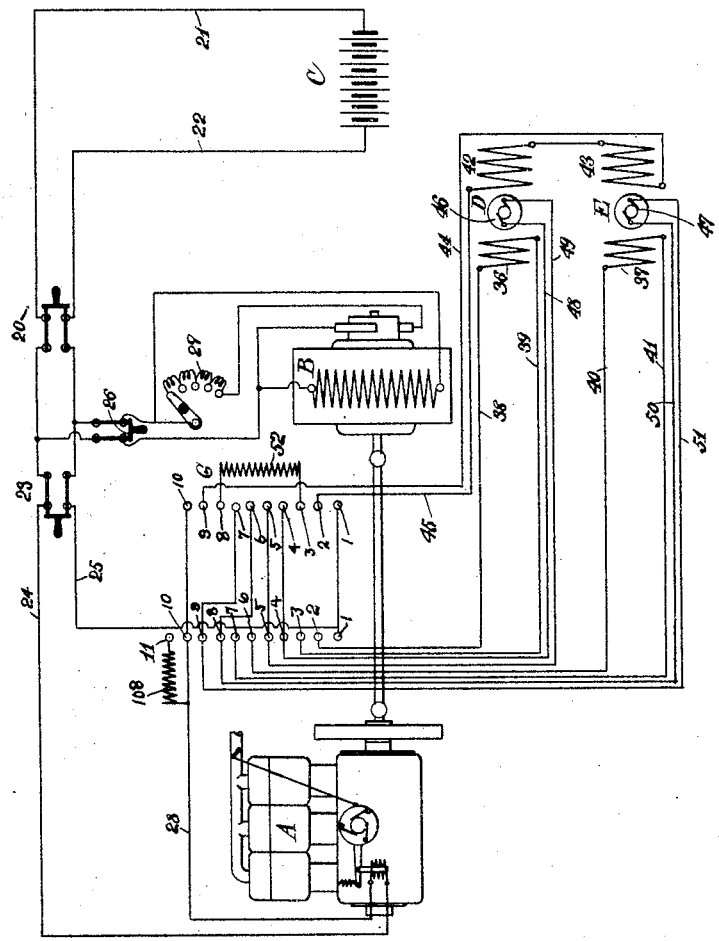
Figure 4:
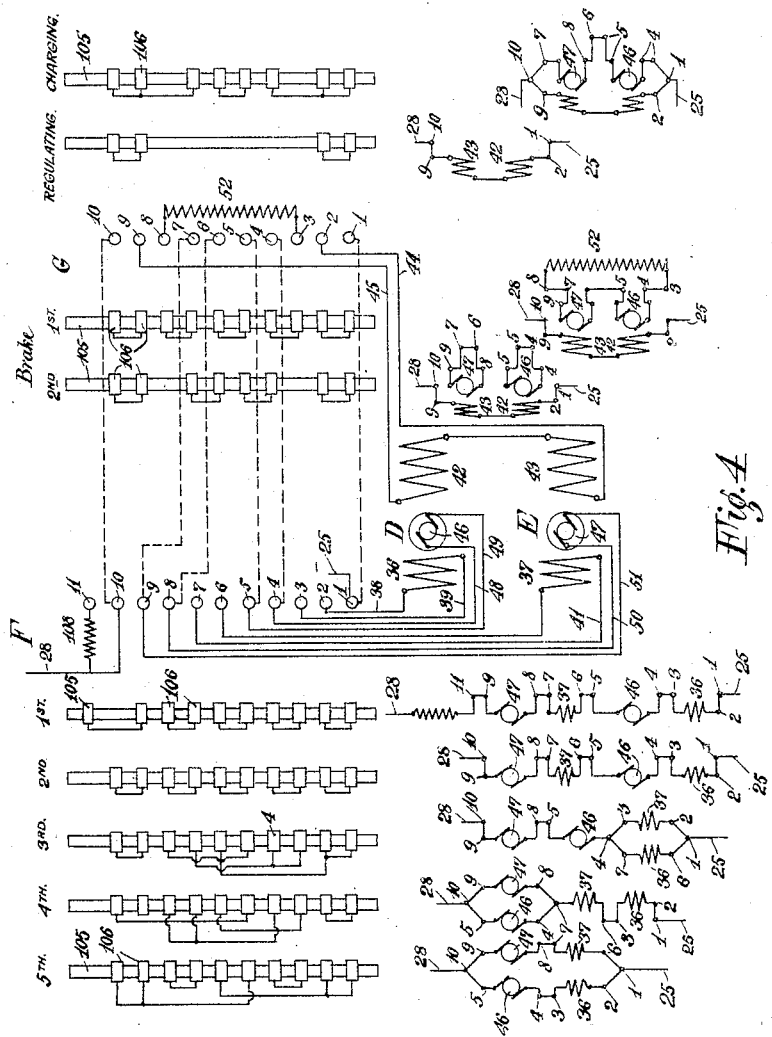

Referring to the accompanying drawings, Figure 1 is a side elevation showing my system as applied to a motor-vehicle. Fig. 2 is a detail view of the interlocking mechanism. Fig. 3 is a plan view showing the general arrangement. Fig. 4 is a diagram of the motor connections for various positions of the controller.

A indicates an engine, preferably internal-combustion or explosive type; B, a dynamo coupled thereto; C, an accumulator or storage battery, which is made of sufficient size to drive the vehicle for a short time without the assistance of the dynamo, but which normally assists the latter when the load is heavy.

D and E are the motors, one being connected to each rear wheel. If preferred, the motor or motors may be connected to one axle to drive both the wheels.

F is the main controller for controlling the speed of the vehicle made under ordinary conditions, and G is the auxiliary controller for causing the motors to act as brakes or to charge the batteries. The main controller F may be of any suitable type—for example, of the general construction illustrated in my Patent No. 714,021, dated November 18, 1902, modified to meet individual conditions. In the drawings it consists in general of an insulating supporting-base 100, revoluble drums, on which are fastened insulating-strips 105, with contact-blocks 106, the terminals 101, to which the various wires are connected, and the spring 102, with contact-blocks 103, of fingers making connections with the different contacts 106 when the drums are revolved.

The wire terminals or contact-fingers are shown numbered 1 to 11 in main controller F and 1 to 10 in the auxiliary controller G. (See Figs. 1 and 2.) The main supply-wires 25 and 28 connect directly with the fingers 1 and 10 in each controller, while the finger 11 of controller F connects with wire 28 through a permanent resistance 108.

In motors D and E armature 46 connects, by means of wires 48 and 49, to contacts 4 and 5 in both controllers; armature 47 of the motor E, by means of wires 50 and 51, to contacts 8 and 9 in the main controller and contacts 6 and 7 in the auxiliary controller. The series field-coil 36 connects, by means of wires 38 and 39, to contacts 2 and 3 in the main controller. Series field-coil 37 connects, by means of wires 40 and 41, to main controller 6 and 7. The shunt field-coils 42 and 43 are connected in series with each other and thence by means of wires 44 and 45 to contacts 2 and 9 in the auxiliary controller. A permanent resistance 52 is connected to contact-fingers 3 and 8 in auxiliary controller.

Main controller F, as shown in the drawings, is shown to have connections for a series-parallel speed control having five speeds. These are plotted in detail in Fig. 4 under F. In the first position the armatures and fields of both motors are in series with resistance. The circuit may be traced from supply-wire 25 to contact-finger 1; 1 to 2 through connections on the insulating-strip; finger 2, through field-coil 36, to finger 3; finger 3, through connections on strip, to finger 4; from 4, through wire 48, armature 46, through wire 49, to contact-finger 5; 5, through connection on strip, to contact-finger 6; 6, through wire 40, field-coil 37, wire 41, to finger 7; from finger 7 through connection on strip-finger 8; from 8, through wire 50, armature 47, and wire 51, to contact-finger 9; from contact-finger 9, through connection on strip, to finger 11 and permanent resistance 108 to main supply-wire 28. In the second position the connections remain the same, except that the resistance is cut out. In the third position the armatures of the motors are in series and the fields in multiple with each other. This circuit may be traced as follows: main supply-wire 25 to contact 1; contact 1, through connections on strip, to contact-finger 2; from finger 2, through wire 38, field-coil 36, and wire 39 to contact 3; from contact 3, through connections on strip to contact 4. In the other coils we have main supply-wire 25 to finger 1; finger 1, through contact on supporting-strip, to finger 6; from finger 6, through wire 40, field-coil 37, and wire 41, to contact-finger 7; from finger 7, through connection on strip, to finger 4. From contact-finger 4, where the connection from the two field-coils joins, the current passes through the wire 48, armature 46, and wire 49, to finger 5; from finger 5, through contact on strip, to the finger 8; from finger 8, through wire 50, armature 47, and wire 51, to finger 9; from finger 9, through connections on strip, to finger 10 and the main supply-wire 28. In the fourth position the armatures are in multiple with each other and the fields in series. The circuit is from main supply-wire 25 to contact 1; from finger 1, through connection on fourth strip, to finger 2; finger 2, through wire 38, field-coil 36, and wire 39, to finger 3; from finger 3, through connections on strip, to finger 6; from finger 6, through wire 40, field-coil 37, and wire 41, to contact-finger 7. Contact-block 7 connects with blocks 4 and 8. From 4 connection is made, through wire 48, armature 46, and wire 49, to finger 5; from finger 5, through connection on strip, to finger 10. From finger 8 connection can be traced through wire 50, armature 47, and wire 51 to finger 9, and from finger 9 through connection on strip 10, joining the circuit from the other armature and connecting with the main supply-wire 28. In the fifth position the two series motors are in multiple with each other. The circuits are as follows: Motor D—from main supply-wire 25 to contact-finger 1; contact-finger 1, through wire 38, field-coil 36, and wire 39, to finger 3; finger 3, through connection on strip, to finger 4; from finger 4, through wire 48, armature 46, and wire 49, to finger 5; from finger 5, through connection on strip, to finger 10. Motor E—from finger 1, through connection on strip, to finger 6; from finger 6, through wire 40, field-coil 37, and wire 41, to finger 7; from finger 7, through connection on strip, to finger 8; from finger 8, through wire 50, armature 47, and wire 51, to contact-finger 9; from finger 9, through connection on strip, to finger 10, joining the circuit of the other motor and then main supply-wire 28.

20 is a switch for disconnecting the circuit 21 22, leading to the accumulator C. A switch 23 is employed for disconnecting the controller and motor circuits 24 25, and 26 is a mainline switch for the dynamo B, which leads through a rheostat 27, connected in series with the armature of the dynamo. It will be noticed that by closing the switches 20 and 23 and opening the switch 26 the vehicle can be run as a simple electric vehicle, or by closing the switches 23 and 26 and opening the switch 20 while the engine A is in operation the motors D and E can be run directly by the current produced by the dynamo B. I have found, however, that by having the battery, dynamo, and controllers all in multiple a better result is obtained and gives a greater flexibility to the entire system.

Suitable means will be provided for reducing the output of the dynamo when the motors are not in circuit—such, for instance, as the automatic means shown in my application Serial No. 107,391, filed May 15, 1902, of which this application is a division.

Although the motors may be controlled for the ordinary running speeds entirely from the controller F, I have provided the auxiliary controller G for conveniently providing additional control when the vehicle is running under light load, for braking, and charging the battery.

In the first position of the auxiliary controller for braking, as shown in Fig. 4, under G, the shunt field-coils 42 43, with which the motors are provided, are placed in series with each other, and the armatures are placed in series through a resistance, causing the motors to slow down. The field-circuit is then from main supply-wire 25 to contact-finger 1; from contact-finger 1, through connections on regulating-strip, to contact-finger 2; from contact-finger 2, through wire 44, field-coil 43, field-coil 42, and wire 45, to contact-finger 9; from contact-finger 9, through connection on strip, to contact-finger 10, and thence to the main supply-wire 28. The armature-circuit is from finger 3, through connection on strip, to finger 4; from finger 4, through wire 48, armature 46, and wire 49, to finger 5; from finger 5, through connection-strip, to finger 6; from finger 6, through wire 50, armature 47, and wire 51, to 7; from finger 7, through contact on strip, to finger 8; through resistance 52 and back to finger 3.

In the second position of the auxiliary controller the field connections remain as before; but the armatures are short-circuited, without resistance interposed. The armature-circuits are: armature 46, wire 49, to contact-finger 5, through connection on strip to contact-finger 4; from contact-finger 4, through wire 48, back to armature 46; from armature 47, through wire 51, to contact-finger 7, through connection on strip to contact-finger 6, through wire 50 back to armature 47.

In the regulating position of the auxiliary controller the connections of the shunt-fields 42 and 43 are unchanged and the armature connections are governed by the position of the main controller. This, if the vehicle be running under light load, will cause the motors to slow down, because the tendency of the motors running as series motors under light load, taking but little current and having weak fields, to increase in speed will be overcome by the strengthening of the field by the additional separate coils.

In the charging position of the auxiliary controller the connections of the shunt-fields are the same as before; but the two armatures 46 and 47 are connected in series with each other and to main supply-wires 25 and 28, so that if the vehicle moves above a certain speed the motors will act as dynamos, forcing the current back through the batteries. The armature-circuit can be traced as follows: main supply-wire 25 to finger 1; from finger 1, through connection-strip, to fourth finger; from finger 4, through wire 48, armature 46, wire 49, to finger 5; from finger 5, through connection on strip, to finger 6; from finger 6, through wire 50, armature 47 and wire 51, to finger 7; from finger 7, through connection on strip, to finger 10, connecting with main supply-wire 28.

In order to prevent the auxiliary controller from being turned to any position except the regulating position at any other time than when the main controller is in the off position, I provide suitable interlocking mechanism between the two controllers. As shown in the drawings, this mechanism consists of a support S, a sliding pin P, and the notched disks 104 and 107. The length of the pin is such that it must be in the notch of one or the other of the two disks. The main controller F is shown set for the first forward position—that is, when contacts 106 of the first bar or strip 105 makes contact with the terminal fingers. The auxiliary controller G is shown set for the regulating-point. The notch N in disk 104 is located so as to be opposite the pin P only when off point is opposite the contact-fingers 103, while in the auxiliary controller G the notch is extended from the off to the regulating point, making it possible to use G in either regulating or off position at any time.

I do not restrict myself to the specific construction and arrangement of parts herein shown, as modifications and changes may be made without departing from the scope of the invention.

Having thus described my invention, I declare that what I claim as new, and desire to secure by Letters Patent, is—

1. In a vehicle, the combination with an accumulator and a motor, of a main and an auxiliary controller, said main controller controlling the speed of the motor, and said auxiliary controller the charging of the accumulator, and means preventing the auxiliary controller from being operated to charge the accumulator except when the main controller is in a certain position, substantially as described.

2. In a vehicle, the combination with a plurality of motors, and a main controller, of an auxiliary controller having means for connecting the armatures of said motors in series through a resistance in one position, and for short-circuiting the armatures of said motors, independently, in another position, and means preventing the operation of the auxiliary controller except when the main controller is in a certain position, substantially as described.

3. The combination with a series motor having shunt field-coils, of a main and an auxiliary controller, the auxiliary controller being operable to energize the shunt field-coils and short-circuit the armature, when the main controller is in a certain position, substantially as described.

4. In a vehicle, the combination with a plurality of motors, and a main controller, of an auxiliary controller having means for varying the relation of the armature-circuits independently of the field-circuits, and means preventing the operation of said auxiliary controller, except when the main controller is in a certain position, substantially as described.

5. In a vehicle, the combination of two controllers, means for operating one of said controllers without operating the other, means permitting limited operation of the second controller irrespective of the position of the first, and means preventing complete operation of the second controller except when the first is in a definite position, substantially as described.

6. In a vehicle, the combination of a plurality of motors, a controller for changing the connections of the motor so as to run in series or parallel, and means for strengthening the fields of said motors, said means being independent of the controller and operable at any position of the controller, substantially as described.

7. In a vehicle, the combination with a plurality of series motors, of a controller adapted to connect them in series and parallel relation, and independent means for strengthening the fields of the motors, substantially as described.

8. In a vehicle, the combination of a main controller controlling ordinary running speeds, an auxiliary controller adjacent thereto controlling the braking, and interlocking means permitting partial operation of the auxiliary controller while the main controller is in operating position, substantially as described.

9. The combination of a main and an auxiliary controller, each carrying a notched disk, and a pin mounted between the disks and projecting at all times in one or the other of said notches, one of said notches being wider than the other to permit limited operation of its controller while the other is in operation, substantially as described.

10. The combination of a main and an auxiliary controller, each carrying a notched disk, the notch in the disk of the auxiliary controller being of greater extent than the notch on the main controller, and a pin mounted between the disks and projecting at all times into one or the other of said notches, substantially as described.

11. The combination with a plurality of series motors having shunt-coils, of a main and an auxiliary controller, the auxiliary controller being operable to energize the shunt field-coils and to connect the armatures in series through a resistance, when the main controller is in a certain position, substantially as described.

In testimony whereof I affix my signature in presence of two witnesses.

LARS G. NILSON.

Witnesses:
JULIAN S. WOOSTER,
GEORGE N. KERR.